(12) United States Patent
Qiu et al.

(10) Patent No.: US 7,889,350 B2
(45) Date of Patent: Feb. 15, 2011

(54) RFOG WITH REDUCED POLARIZATION MODE INDUCED BIAS ERROR

(75) Inventors: Tiequn Qiu, Glendale, AZ (US); Glen A Sanders, Scottsdale, AZ (US); Lee Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 284 days.

(21) Appl. No.: 12/323,264

(22) Filed: Nov. 25, 2008

(65) Prior Publication Data

US 2010/0128277 A1 May 27, 2010

(51) Int. Cl.
*G01C 19/72* (2006.01)
(52) U.S. Cl. ........................... 356/461; 356/460
(58) Field of Classification Search ............... 356/459, 356/460, 461, 465, 470, 483
See application file for complete search history.

(56) References Cited

U.S. PATENT DOCUMENTS

| 6,825,935 B2 * | 11/2004 | Nakamura et al. ........... 356/483 |
| 2007/0242276 A1 * | 10/2007 | Hughes et al. .............. 356/461 |
| 2008/0137091 A1 * | 6/2008 | Sanders et al. ............. 356/461 |

* cited by examiner

*Primary Examiner*—Michael A Lyons
(74) *Attorney, Agent, or Firm*—Fogg & Powers LLC

(57) ABSTRACT

Hollow core fiber RFOG having symmetric M-(or W-)shape, three-(or two-)mirror configurations. These symmetric configurations help to cancel out polarization error induced bias of the RFOG even when light of the unwanted ESOP is present. The RFOG resonator with optical components forming substantially small cross-coupling angles between their polarization axes, and/or with polarizing elements inserted into the resonator, and/or with resonator mirrors having identical reflectivity for light of different polarization states, can effectively reduce the polarization mode induced bias error.

20 Claims, 12 Drawing Sheets

US 7,889,350 B2

RFOG WITH REDUCED POLARIZATION MODE INDUCED BIAS ERROR

BACKGROUND OF THE INVENTION

A typical resonator fiber optic gyroscope (RFOG) is a rotation rate measurement apparatus that uses a recirculating ring resonant cavity to enhance the rotation-induced Sagnac effect. FIG. 1 is a typical RFOG optical circuit, which includes monochromatic light sources 111 and 112, a ring resonator cavity 100 having an optical fiber coil 118, and input and output coupling optical components 115 and 116 for coupling the monochromatic lightwaves into and out of the cavity. The coupling optical components may be optical directional couplers and/or mirrors. When the optical path of the resonator includes both optical fibers and free space, collimator lenses may be needed to couple lightwaves in the optical fiber with the optical beams in free space (not shown in FIG. 1). Other optical components, like a polarizer 117, may be used in the resonator to improve gyro performance. For rotation sensing, monochromatic lightwaves are phase- or frequency-modulated by modulators 113 and 114 before being coupled into the resonator in clockwise (CW) and counterclockwise (CCW) directions. The frequencies of CW and CCW lightwaves are tuned separately by servo electronics to the resonance frequencies of the resonator through monitoring the signals from photo detectors 121 and 122. The difference of the resonant frequencies of CW and CCW lightwaves are measured to determine the rotation rates.

The cavity of an RFOG typically supports two polarization modes that reproduce their polarization states after each round trip of the resonator. The concept of eigenstate of polarization (ESOP) has been introduced to denote these special polarization states of the resonator in analyzing the polarization error induced bias of the RFOG. For rotation sensing, the polarization state of the input lightwave is preferably aligned with one of the ESOPs of the resonator (referred to as the first ESOP) so that only one resonance characteristic is used for rotation sensing. The difference of the resonant frequencies of the CW and CCW lightwaves of this first ESOP shall be measured for determination of the rotation rate. However, due to imperfections of the alignment of the input light polarization state and polarization cross-couplings in the resonator, some light may be coupled to the second ESOP of the resonator. Since the two ESOPs have different optical path lengths in the resonator due to polarization mode dispersion, they have different resonant frequencies. Coexistence of the second ESOP with the first ESOP in the resonator causes deformation of the total resonance lineshape, leading to deviation of the measured resonant frequency from the true resonant frequency of the first ESOP. This is the cause of the so called polarization errors in the rotation sensing. Polarization induced errors may severely limit the accuracy of the RFOG.

The polarization errors in the RFOG generally depend on the magnitude of light propagating in the second ESOP. Several mechanisms may couple light into the undesired second ESOP of the resonator. Light may be cross-coupled by the resonator coupling components 115 and 116 (e.g. the couplers and/or mirrors) and the sensing fiber (optical fiber coil 118). One way to limit such polarization cross-coupling inside the sensing fiber is to employ polarization maintaining (PM) fibers. PM fiber incorporates stress elements in the fiber that define different speeds of light (i.e., birefringence) that attenuates the cross-coupling of light from one polarization state to the other. However, cross-couplings in the coupling optics will still excite the second undesirable polarization state in the PM fiber. The difference in speed of light between light traveling on the two principle axes of polarization in the PM fiber typically varies with temperature, leading to bias instability induced by polarization errors.

One method to reduce the temperature sensitivity of the light speed of the two ESOPs of the resonator is to incorporate a 90° splice 119 in the PM fiber resonator shown in FIG. 1. This effectively results in circular polarized ESOPs (one is left circular polarized, the other is right circular polarized) having 180° phase difference. The circular ESOPs have substantially identical speed of light (i.e., substantially small birefringence) and are much less sensitive to temperature variation. However, the intensity of the second ESOP is closed to that of the first ESOP in this case. Any imperfections in the 90° splice and cross-couplings in the couplers will shift the phase difference between the two circular ESOPs from 180°, generating asymmetry of the resonance lineshape used to measure rotation rate.

Another method to reduce the temperature sensitivity of the light speed of the two ESOPs of the resonator is to use a PM fiber having a hollow core. The lightwaves are mostly guided in the air core of a hollow core fiber (>95%). The birefringence of the hollow core fiber is determined by the geometric shape of the fiber cross-section instead of by the stresses. The temperature sensitivity of the fiber birefringence is significantly reduced.

FIG. 2 shows a prior art hollow core fiber resonator 200 that includes a hollow core fiber coil 210, an input coupling mirror 212, two output coupling mirrors 211 and 213, collimating optics 214 and 215 for coupling light in and out of the hollow core fiber coil 210. Use of three cavity mirrors is advantageous to guarantee all lightwaves impinging on photo detectors being spatially mode-filtered by the optical fiber. This mode-filtering reduces resonance asymmetry through removal of stray lights impinging on the photo detectors.

To further reduce the contribution of the second ESOP to the bias error, methods of inserting polarizers into the resonator and/or using polarizing fibers have also been suggested. The power in the second ESOP can be substantially reduced by the highly polarizing elements in the resonator whose pass-axis are oriented along the first ESOP.

SUMMARY OF THE INVENTION

In this invention, new theoretical expressions to precisely evaluate the impact of polarization error on bias are first deduced. The theory is then applied to an exemplary embodiment of hollow core fiber RFOG having an M-shape three-mirror configuration. The simulation results find that the three-mirror resonator is advantageous to achieve a possibly symmetric resonator configuration that helps to cancel out polarization error induced bias of the RFOG even when the second ESOP is present. The effectiveness of insertion of polarizing elements in the resonator and minimizing misalignment angles between all the optical component's polarization axes are evaluated by the theory for mitigation of polarization errors. In addition, the theory shows that using optical components (e.g. mirrors and couplers) with identical reflectivities and losses for different polarization modes (e.g. the horizontal- and vertical-polarized light) can effectively reduce the polarization errors. The smaller incident angle on the mirrors in the M-shaped resonator helps to obtain identical dielectric mirror reflectivity for light with different polarization states. At last, several two mirror hollow core fiber resonators are suggested as embodiments of the invention.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
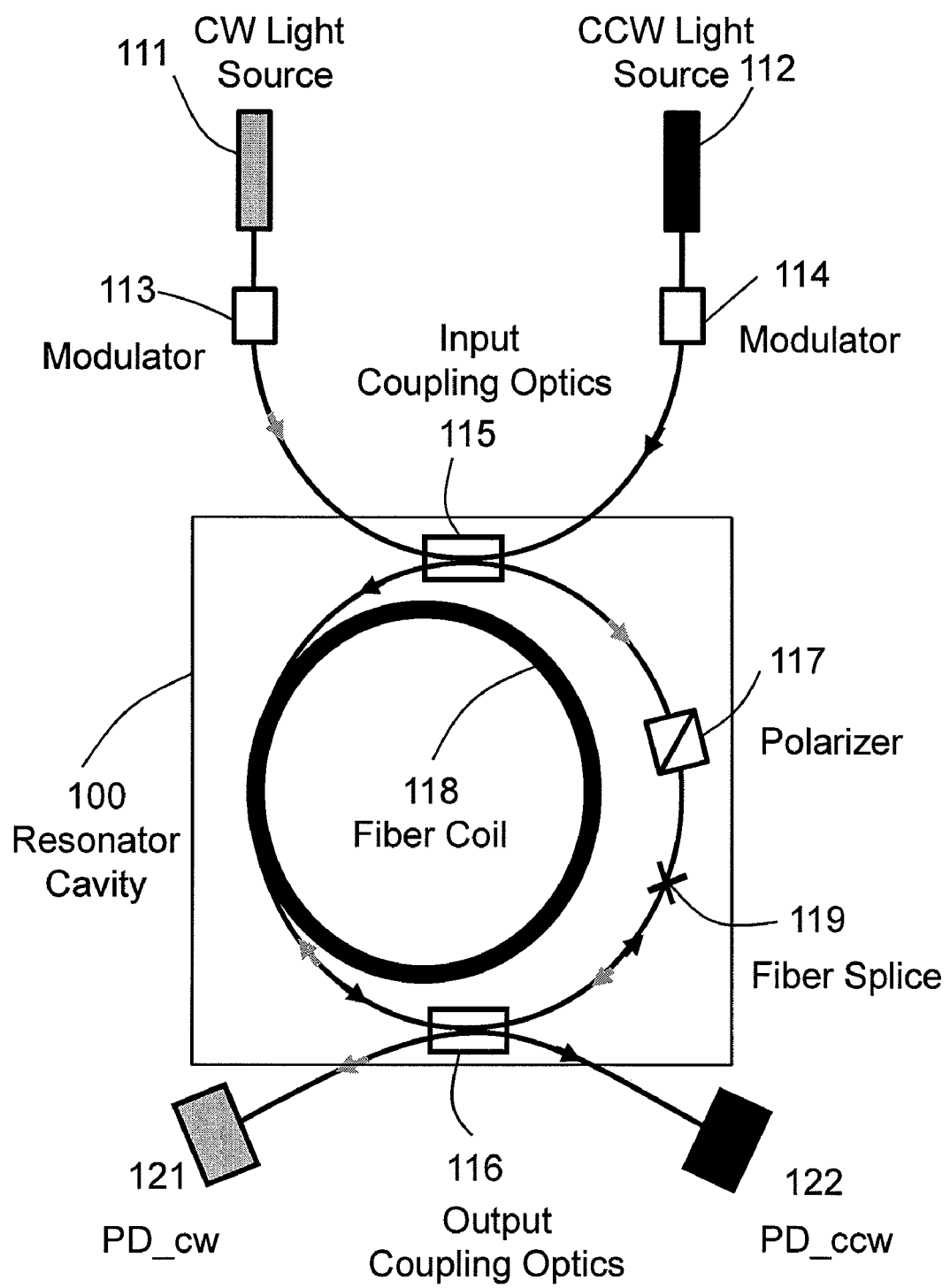
FIG. 1 is a schematic view of a typical prior art RFOG using an all-fiber resonator.
Figure 2:
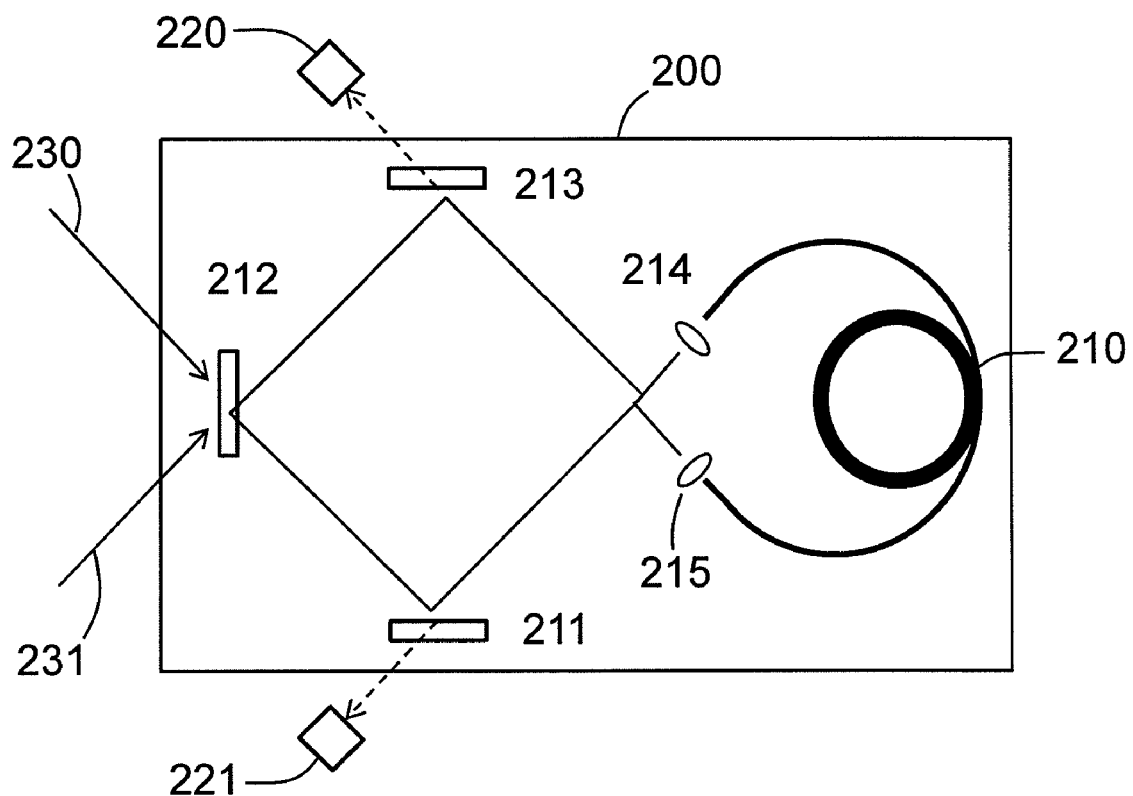
FIG. 2 is a schematic view of a prior art RFOG using a hollow core fiber.

In a resonator fiber optic gyroscope, a monochromatic light source is phase modulated before being coupled into the resonator. After sinusoidal phase modulation of $\Phi_m = M \sin \omega_m t$, the lightwave field becomes $$E_{in}(t) = \frac{1}{2} E_0 e^{i\theta(t)} \exp(i\omega_c t) \exp(iM \sin\omega_m t) + c.c. \quad (1)$$

Here, $E_0$ is the input light field amplitude, $\omega_m$ is the phase modulation angular frequency (all angular frequencies will be referred to as frequencies in the following for simplicity), M is the phase modulation amplitude in unit of radians, $\omega_c$ is the lightwave central frequency, and $\theta(t)$ is the initial phase of the lightwave at time t, and c.c. stands for complex conjugation of the term on the immediate left. The instantaneous frequency of the modulated light is obtained by differentiating its phase with time, which is $\omega(t) = \omega_c + M\omega_m \cos \omega_m t$. Using the relation of $$\exp(iz\sin x) = \sum_{n=-\infty}^{\infty} J_n(z)\exp(inx), \quad \text{Eq. (1)}$$

can be expanded in terms of Bessel functions $J_n$ $$E_{in}(t) = \frac{1}{2} E_0 e^{i\theta(t)} \sum_{n=-\infty}^{\infty} J_n(M)\exp(i(\omega_c + n\omega_m)t) + c.c. \quad (2)$$

where n is an integer number range from $-\infty$ to $+\infty$. It is obvious from the above equation that the field of the modulated light contains many harmonic frequencies shifted from $\omega_c$ by integer numbers of the modulation frequency $\omega_m$.

To analyze the polarization properties of a resonator fiber optic gyroscope (RFOG), 2×2 Jones matrices are used to describe optical components and polarization cross-couplings in the resonator. The light field, such as $E_{in}$, is expressed by a 2×1 Jones vector. The input light $E_{in}$ is coupled into the resonator and propagates to the output coupling optics. The field vector S of light arriving at the output coupling optics (but before completing its first round-trip through the resonator) is expressed as $S = G \cdot E_{in}$, where G is another Jones matrix. The field S can be projected onto the two eigenstate of polarization (ESOP) of the resonator. Assuming the first ESOP-a field vector is $V_a$ and the second ESOP-b field vector is $V_b$, we have $$S = \chi_a V_a + \chi_b V_b \quad (3)$$

The coefficients $\chi_a$ and $\chi_b$ determine the relative intensity of each ESOP. Due to the recirculating resonator, multiple light fields from different number of round-trips are overlapped. The total electric field $E_a$ of the ESOP-a is a superposition of all these fields whose amplitudes are determined by the resonator round trip amplitude transmission coefficient $\lambda_a$ (or more properly called the eigenvalue of the ESOP-a), $$E_a(t) = \frac{\chi_a V_a}{2} \sum_{n=-\infty}^{\infty} J_n(M)\exp(i(\omega_c + n\omega_m)t) \quad (4)$$

$$\sum_{p=0}^{\infty} \lambda_a^p \exp(-i(\omega_c + n\omega_m)p\tau)\exp[i\theta(t - p\tau)] + c.c.$$

Here, $\tau$ is resonator round-trip time, p is an integer that identifies the number of round trips the light has traveled. Similarly, the electric field $E_b$ of the ESOP-b can be expressed by the following equation after replacing letter "a" with "b" for identifying the ESOP difference.

$$E_b(t) = \frac{\chi_b V_b}{2} \sum_{m=-\infty}^{\infty} J_m(M)\exp(i(\omega_c + m\omega_m)t) \quad (5)$$

$$\sum_{q=0}^{\infty} \lambda_b^q \exp(-i(\omega_c + m\omega_m)q\tau)\exp[i\theta(t - q\tau)] + c.c.$$

The electric field impinging onto the photodetector is determined by the Jones matrix of the output coupling optical component, e.g., a dielectric mirror or a fiber coupler, which couples the intra-cavity fields $E_a$ and $E_b$ to the photodetector. Assume the Jones matrix of the output coupling optics is $$\begin{pmatrix} t_x & 0 \\ 0 & t_y \end{pmatrix} \quad (6)$$

For a mirror, this means the amplitude transmission of the mirror is $t_x$ for p-polarized light (field vector lies in the plane of incidence) and $t_y$ for s-polarized light (field vector lies orthogonal to the plane of incidence). Since the resonator ESOPs may not align with the p- or s-polarization state of the mirror, the Jones vector of the total light field coupled out of the resonator is $$E_{PD} = \begin{pmatrix} E_{PDx} \\ E_{PDy} \end{pmatrix} = \begin{pmatrix} t_x & 0 \\ 0 & t_y \end{pmatrix} \begin{pmatrix} E_{ax} + E_{bx} \\ E_{ay} + E_{by} \end{pmatrix} = \begin{pmatrix} t_x(E_{ax} + E_{bx}) \\ t_y(E_{ay} + E_{by}) \end{pmatrix} \quad (7)$$

The intensity of the light impinging on the photodetector is then calculated as $$I_{PD} = (E_{PDx}^* \ E_{PDy}^*) \begin{pmatrix} E_{PDx} \\ E_{PDy} \end{pmatrix} \quad (8)$$

$$= (|t_x|^2|E_{ax}|^2 + |t_y|^2|E_{ay}|^2) + (|t_x|^2|E_{bx}|^2 + |t_y|^2|E_{by}|^2) +$$

$$(|t_x|^2 E_{ax}^* E_{bx} + |t_y|^2 E_{ay}^* E_{by} + c.c.)$$

The resonance characteristic seen by the photo detector when laser frequency is scanned can be obtained by substituting Eq. (4) and (5) into (8). For the case when no phase modulation is applied (i.e., M=0), the following expression of resonance is obtained after lengthy mathematical manipulations:

$$I_{PD}(\omega_c) = \frac{(|t_x \chi_a V_{ax}|^2 + |t_y \chi_a V_{ay}|^2)}{1 - (\lambda_a \lambda_a^*)} \cdot \quad (9)$$

$$\left(1 + \frac{\lambda_a e^{-i\omega_c \tau} e^{-2\pi\Delta\nu\tau}}{1 - \lambda_a e^{-i\omega_c \tau} e^{-2\pi\Delta\nu\tau}} + \frac{\lambda_a^* e^{i\omega_c \tau} e^{-2\pi\Delta\nu\tau}}{1 - \lambda_a^* e^{i\omega_c \tau} e^{-2\pi\Delta\nu\tau}}\right) +$$

$$\frac{(|t_x \chi_b V_{bx}|^2 + |t_y \chi_b V_{by}|^2)}{1 - (\lambda_b \lambda_b^*)} \cdot \left(1 + \frac{\lambda_b e^{-i\omega_c \tau} e^{-2\pi\Delta\nu\tau}}{1 - \lambda_b e^{-i\omega_c \tau} e^{-2\pi\Delta\nu\tau}} + \right.$$

$$\left. \frac{\lambda_b^* e^{i\omega_c \tau} e^{-2\pi\Delta\nu\tau}}{1 - \lambda_b^* e^{i\omega_c \tau} e^{-2\pi\Delta\nu\tau}}\right) + \left[\frac{[(t_x \chi_a V_{ax})(t_x \chi_b V_{bx})^* + (t_y \chi_a V_{ay})(t_y \chi_b V_{by})^*]}{1 - (\lambda_a \lambda_b^*)}\right] \cdot$$

$$\left(1 + \frac{\lambda_a e^{-i\omega_c \tau} e^{-2\pi\Delta\nu\tau}}{1 - \lambda_a e^{-i\omega_c \tau} e^{-2\pi\Delta\nu\tau}} + \frac{\lambda_b^* e^{i\omega_c \tau} e^{-2\pi\Delta\nu\tau}}{1 - \lambda_b^* e^{i\omega_c \tau} e^{-2\pi\Delta\nu\tau}}\right) + c.c.\right]$$

Here $\Delta\nu$ is the frequency bandwidth in unit of Hz of the monochromatic light source which is deduced from time average of the random phase $\theta(t)$ of the light. Three resonance terms in the above equation correspond to different polarization modes. The first term is the resonance of the first ESOP-a for rotation rate sensing. The second term is the resonance of the unwanted second ESOP-b. The third term is the resonance originated from the interference of ESOP-a and ESOP-b. The last two terms are the origins of polarization error induced bias and shall be minimized and/or controlled.

For the case when the phase-modulator is turned on (i.e., M≠0), the electric fields in (8) contain many frequency components of $\omega_c \pm n\omega_m$ with amplitude proportional to $J_n(M)$. They beat with each other and produce harmonic electric signals at frequencies of multiple $\omega_m$ in the photodetector.

These signals can be demodulated and used for servo electronics to find the resonance frequency of the resonator.

The intensity $B_{nmab}$ of the signals originated from the beating of the $E_a$'s $\omega_c + n\omega_m$ frequency component with $E_b$'s $\omega_c + m\omega_m$ frequency components (temporarily ignoring the coefficients of $\chi_a V_a$ and $\chi_b V_b$) can be obtained after mathematical manipulations:

$$B_{nmab} = [J_n(M)\exp(i(\omega_c + n\omega_m)t)\sum_{p=0}^{\infty} \lambda_a^p \quad (10)$$

$$\exp(-i(\omega_c + n\omega_m)p\tau)\exp[i\theta(t - p\tau)]]$$

$$[J_m(M)\exp(-i(\omega_c + m\omega_m)t)\sum_{q=0}^{\infty} \lambda_b^{*q}$$

$$\exp(i(\omega_c + m\omega_m)q\tau)\exp[-i\theta(t - q\tau)]]$$

$$= \frac{J_n(M)J_m(M)e^{i(n-m)\omega_m t}}{1 - (\lambda_a \lambda_b^*)e^{-i\omega_m(n-m)\tau}}$$

$$\begin{pmatrix} \lambda_a e^{-i(\omega_c + n\omega_m)\tau} \\ 1 + \frac{e^{-2\pi\Delta\nu\tau}}{1 - \lambda_a e^{-i(\omega_c + n\omega_m)\tau}} + \frac{\lambda_b^* e^{i(\omega_c + m\omega_m)\tau} e^{-2\pi\Delta\nu\tau}}{1 - \lambda_b^* e^{i(\omega_c + m\omega_m)\tau} e^{-2\pi\Delta\nu\tau}} \\ e^{-2\pi\Delta\nu\tau} \end{pmatrix}$$

$B_{nmab}$ is used to evaluate the beat signal of two lightwaves from two different ESOPs having a frequency difference of $|n-m|\omega_m$. This is the term that describes the interference of ESOP-a and ESOP-b due to cross-couplings at the output coupling optics. Similarly, $B_{nmaa}$ or $B_{nmbb}$ can be used to calculate the beat signal of two lightwaves from the same ESOP-a or ESOP-b, having a frequency difference of $|n-m|\omega_m$. Using a simplification relation $$B_{nmab} = W_{nmab} \cdot \exp[i(n-m)\omega_m t] \quad (11)$$

which separates the time dependent sinusoidal term from its coefficients, Eq. (8) can be used to calculated the total signal intensity at rth harmonic frequency of $(m-n)\omega_m = r\omega_m$:

$$I_{r\omega_m} = 2(|t_x|^2|\chi_a V_{ax}|^2 + |t_y|^2|\chi_a V_{ay}|^2) \quad (12)$$

$$\sum_{m=n+r=-\infty}^{\infty} (\cos(r\omega_m t)\text{Re}(W_{nmaa}) + \sin(r\omega_m t)\text{Im}(W_{nmaa})) +$$

$$2(|t_x|^2|\chi_b V_{bx}|^2 + |t_y|^2|\chi_b V_{by}|^2)$$

$$\sum_{m=n+r=-\infty}^{\infty} (\cos(r\omega_m t)\text{Re}(W_{nmbb}) + \sin(r\omega_m t)\text{Im}(W_{nmbb})) +$$

$$\sum_{m=n+r=-\infty}^{\infty} 2\cos(r\omega_m t) \begin{bmatrix} \text{Re}(|t_x|^2 \chi_a \chi_b^* V_{ax} V_{bx}^* + \\ |t_y|^2 \chi_a \chi_b^* V_{ay} V_{by}^*)\text{Re}(W_{nmab} + W_{mnab}) - \\ \text{Im}(|t_x|^2 \chi_a \chi_b^* V_{ax} V_{bx}^* + \\ |t_y|^2 \chi_a \chi_b^* V_{ay} V_{by}^*)\text{Im}(W_{nmab} + W_{mnab}) \end{bmatrix} +$$

$$\sum_{m=n+r=-\infty}^{\infty} 2\sin(r\omega_m t) \begin{bmatrix} \text{Re}(|t_x|^2 \chi_a \chi_b^* V_{ax} V_{bx}^* + \\ |t_y|^2 \chi_a \chi_b^* V_{ay} V_{by}^*)\text{Im}(W_{nmab} - W_{mnab}) + \\ \text{Im}(|t_x|^2 \chi_a \chi_b^* V_{ax} V_{bx}^* + \\ |t_y|^2 \chi_a \chi_b^* V_{ay} V_{by}^*)\text{Re}(W_{nmab} - W_{mnab}) \end{bmatrix}$$

From the polarization mode point of view, the signal $I_{r\omega_m}$ contains three terms, one from ESOP-a, one from ESOP-b, and another one from cross-coupling of ESOP-a and ESOP-b.

Equation (12) is the major theoretical expression used to calculate the impact of polarization mode induced bias errors in this invention.

The signal $I_{r\omega_m}$ contains $\sin(r\omega_m t)$ and $\cos(r\omega_m t)$ terms. It can be generally expressed as $$I_{r\omega_m} = A_S \sin(r\omega_m t) + A_C \cos(r\omega_m t) \tag{13}$$

Demodulation of the sinusoidal signal at $r\omega_m$ and at a phase of $\phi_{dm}$ can thus be obtained by multiplication of the above signal with $\sin(r\omega_m t + \phi_{dm})$, which is $$\begin{aligned} I_{dm\_r} &= A_s \sin(r\omega_m t)\sin(r\omega_m t + \phi_{dm}) + \\ &\quad A_c \cos(r\omega_m t)\sin(r\omega_m t + \phi_{dm}) \\ &= A_s \cos\phi_{dm} + A_s \cos(2r\omega_m t + \phi_{dm}) + \\ &\quad A_c \sin\phi_{dm} + A_c \sin(2r\omega_m t + \phi_{dm}) \end{aligned} \tag{14}$$

After rejecting the AC signal, the demodulated signal at $\phi_{dm}$ becomes $$I_{dm\_r}(\phi_{dm}) = A_s \cos\phi_{dm} + A_c \sin\phi_{dm} \tag{15}$$

Its corresponding quadrature signal is at phase $\phi_{dm} + \pi/2$ $$I_{dm\_r}\left(\phi_{dm} + \frac{\pi}{2}\right) = -A_s \sin\phi_{dm} + A_c \cos\phi_{dm} \tag{16}$$

They are useful signals for rotation rate sensing. One way to detect the CW and CCW resonance peak shift is to lock the laser frequencies to the resonance peaks and find the difference of the laser frequencies. In this case, the first harmonic of modulation frequency (r=1) is of interest. The dependence (normally called a discriminant) of the first-harmonic demodulated signal $I_{dm\_1}$ on laser frequency crosses a zero when the laser frequency is at a resonance peak. The servo loop uses this characteristic as the feedback signal for tracking the resonance peak.

Figure 3:
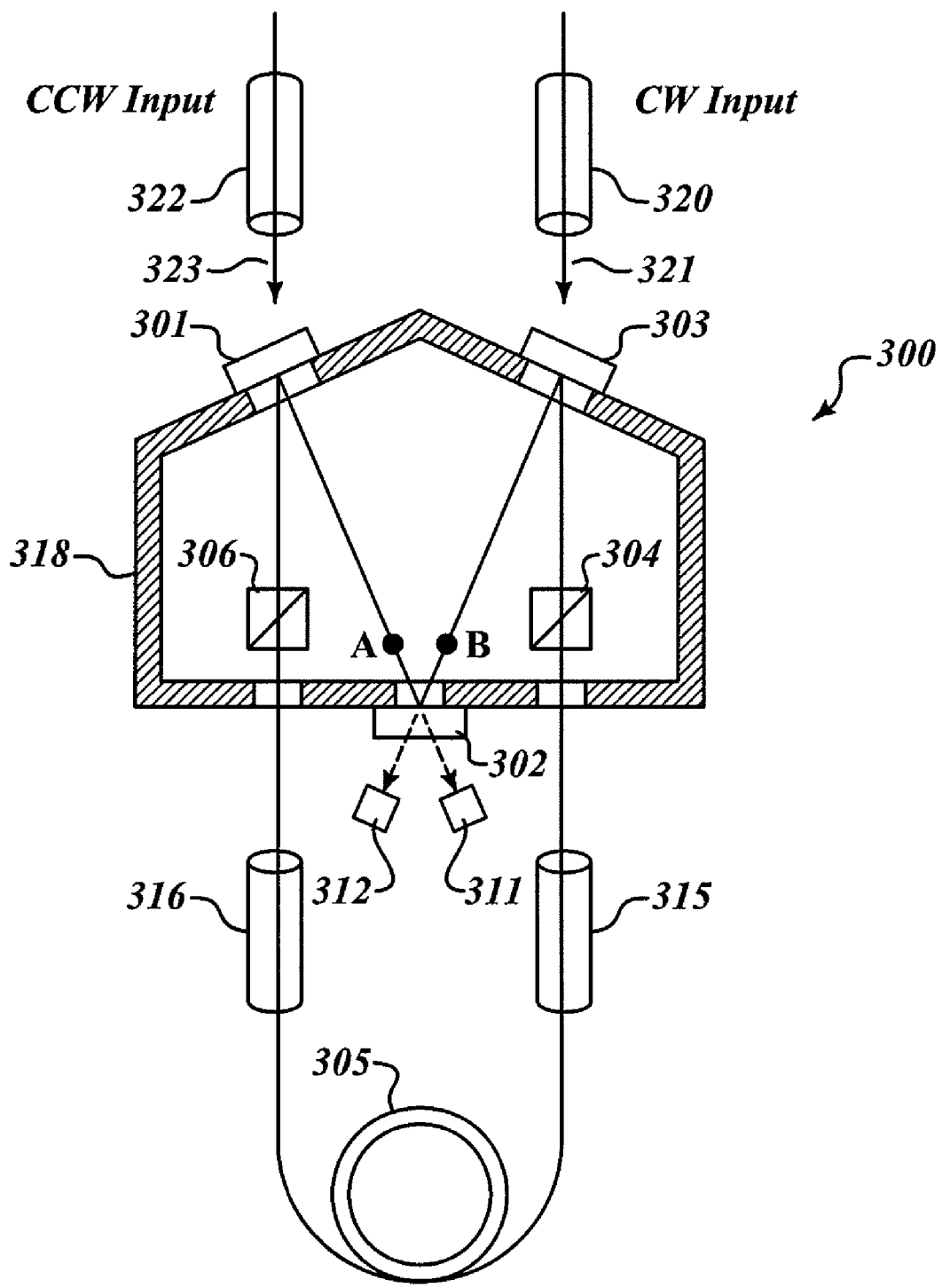
FIG. 3 is a schematic view of RFOG resonator according to an embodiment of the invention.

The above theoretical expression is intended to cover a broad range of RFOGs that includes any kind of resonator cavity, fiber types, input/output coupling optics whose optical properties can be described by Jones matrices. They can be used to quantitatively analyze RFOG bias errors originated from polarization cross-couplings and imperfections of the resonator. As an exemplary application of the theory, FIG. 3 shows an embodiment of an RFOG that reduces the polarization induced bias errors. The RFOG includes an M-shape resonator 300 that includes a hollow core fiber coil 305, an input coupling mirror 301 (for a CCW beam 323) and an input coupling mirror 303 (for a CW beam 321), an output coupling mirror 302, a polarizing element 304 and 306, and collimating optics 315 and 316. The input beams 321 and 323 are collimated by collimating optics 320 and 322. The resonator mirrors 301-303 are supported by a solid frame (housing) 318 to provide mechanical stability of the resonator 300. The solid frame may be made of one or more pieces of metal, glass, ceramics, or other material with substantially small deformation when subject to temperature changes and stresses. The output coupled CW and CCW light are directed to the photodetectors 311 and 312 respectively for resonance signal detection.

In this embodiment, the fiber coil 305 is assumed to be polarization maintaining (PM) fiber that has two linear orthogonal polarization axes. The Jones matrix of the fiber can thus be expressed as $$F = \begin{pmatrix} e^{-i\varphi_x} & 0 \\ 0 & e^{-i\varphi_y} \end{pmatrix} \tag{17}$$

where $\phi_x$ and $\phi_y$ are the phase delays of the two polarization modes of the PM fiber. The Jones matrices of three reflecting mirrors, 301, 302 and 303 (denoted by h=1, 2 and 3), are $$R_h = \begin{pmatrix} r_{hx} & 0 \\ 0 & r_{hy} \end{pmatrix}, h = 1, 2, 3 \tag{18}$$

where $r_{hx}$ and $r_{hy}$ are the amplitude reflectivity of the mirror for light polarized parallel (x-component) and orthogonal (y-component) to the plane of incidence. The Jones matrices of the polarizers 304 and 306 (denoted by l=4 and 6) are $$P_l = \begin{pmatrix} 1 & 0 \\ 0 & \varepsilon_l \end{pmatrix}, l = 4, 6 \tag{19}$$

where $\epsilon_l^2$ is the polarization extinction ratio (PER). For a mirror, the plane of incidence is defined as the plane that contains the input and the reflected beams. If the polarization pass-axis of the polarizer 304 does not lie within the plane of incidence of the mirror 303 (but form an angle $\alpha_{34}$ between them), a rotation matrix $$X_{mn} = \begin{pmatrix} \cos\alpha_{mn} & \sin\alpha_{mn} \\ -\sin\alpha_{mn} & \cos\alpha_{mn} \end{pmatrix} \tag{20}$$

with m=3, n=4 (denoting element 303 and 304) has to be introduced to describe the effect of polarization cross-coupling. Similarly, if a light beam is reflected by two consecutive mirrors 302 and 303 whose planes of incidence do not coincide (but form an angle $\alpha_{23}$), a rotation matrix $X_{23}$ (similar to $X_{34}$ in form except for $\alpha_{34}$ being replaced with $\alpha_{23}$) is needed to describe the cross-coupling. In this manner, the clockwise round-trip matrix of the resonator starting from point A can be given as $$H_{CW\_A} = X_{12} \cdot R_1 \cdot X_{61} \cdot P_6 \cdot X_{56} \cdot F_5 \cdot X_{45} \cdot P_4 \cdot X_{34} \cdot R_3 \cdot X_{23} \cdot R_2 \tag{21}$$

Similarly, the counter-clockwise round-trip matrix of the resonator starting from point B is $$H_{CCW\_B} = X_{32} \cdot R_3 \cdot X_{43} \cdot P_4 \cdot X_{54} \cdot F_5 \cdot X_{65} \cdot P_6 \cdot X_{16} \cdot R_1 \cdot X_{21} \cdot R_2 \tag{22}$$

Here, $X_{mn}$ stands for a rotation on matrix (equation 20) with m and n being the last digit of component labels in FIG. 3 for light propagates from element "30 m" towards element "30n".

$H_{CW\_A}$ and $H_{CW\_B}$ are important matrices of the resonator for the CW and CCW light propagation. Their eigenvalues $\lambda_a$, $\lambda_b$ and eigenvectors $V_a$, $V_b$ are needed for equation (10) and (12) to calculate the bias errors.

ESOP, Resonances and Discriminants

Figure 4:
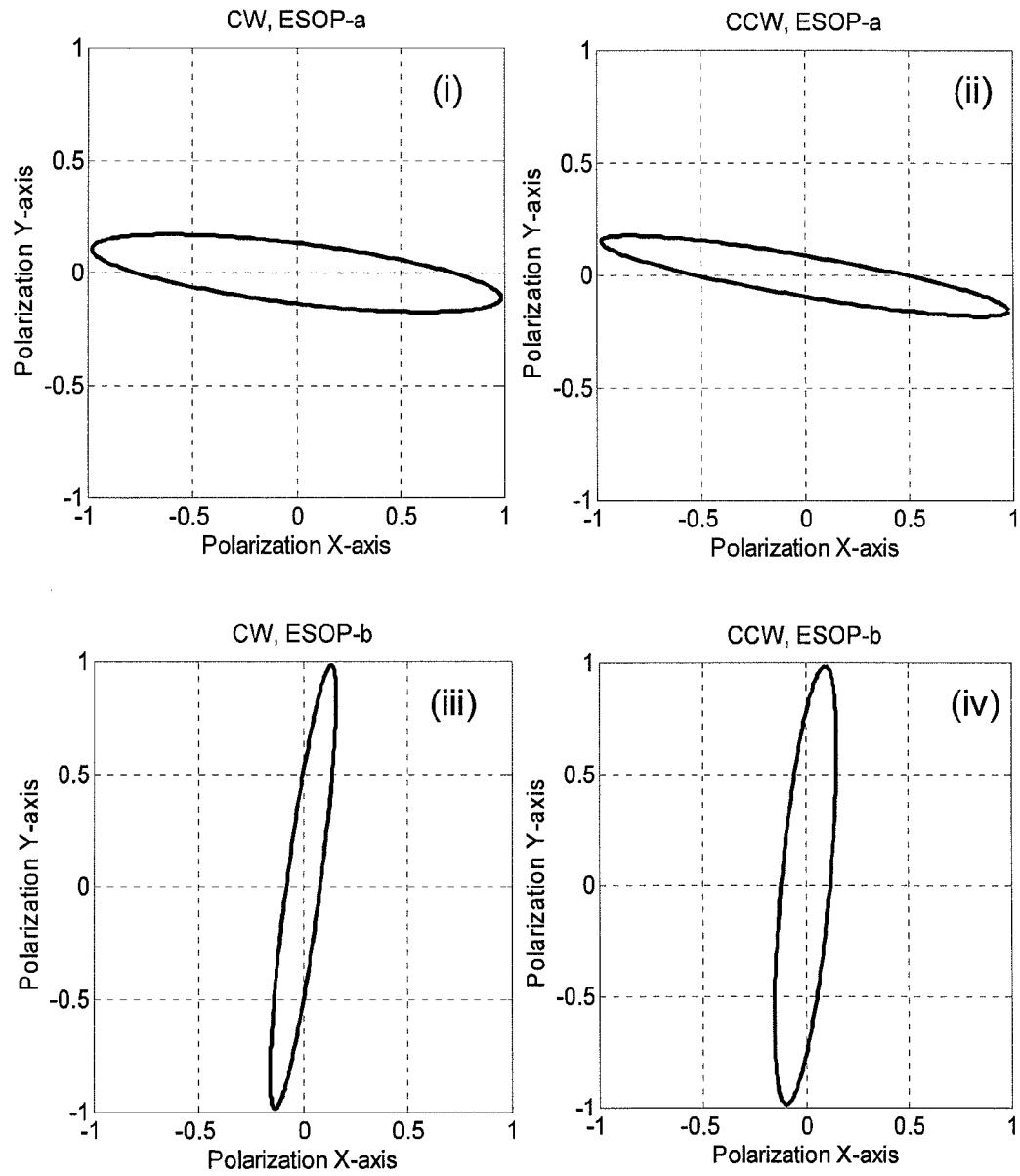
FIGS. 4i-iv are plots of RFOG eigenstates of polarization (ESOPs) associated with CW and CCW resonators of an embodiment of the invention.

For the resonator 300 shown in FIG. 3, if the plane of incidence of the three mirrors 301-303, the polarization axis of the polarization maintaining (PM) fiber, and the polarization pass-axis of polarizers form small angles with each other (i.e., the $\alpha_{mn}$ angles of each $X_{mn}$ matrix are small angles), the two eigen polarization states ESOP-a and ESOP-b are typically elliptical (or linear) polarization states oriented close to horizontal and vertical positions. Since $H_{CW\_A}$ and $H_{CW\_B}$ are normally different, the ESOP-a and ESOP-b of CW and CCW are typically not identical. FIGS. 4i-iv shows an example of calculated ESOPs of CW and CCW resonators (the polarizers 304 and 306 are assumed here to have zero polarization extinction ratios for easier observation of the ESOP differences).

Although eigen polarization states are different for CW and CCW resonators, the eigenvalues of CW ESOP-a and ESOP-b are always identical to those of CCW counter parts. It is this property that makes rotation sensing of Sagnac phase possible. In other words, when the resonator is at rest, the phase shift for CW and CCW round trip is identical even when CW ESOP-a (ESOP-b) is different from CCW ESOP-a (ESOP-b).

Figure 5:
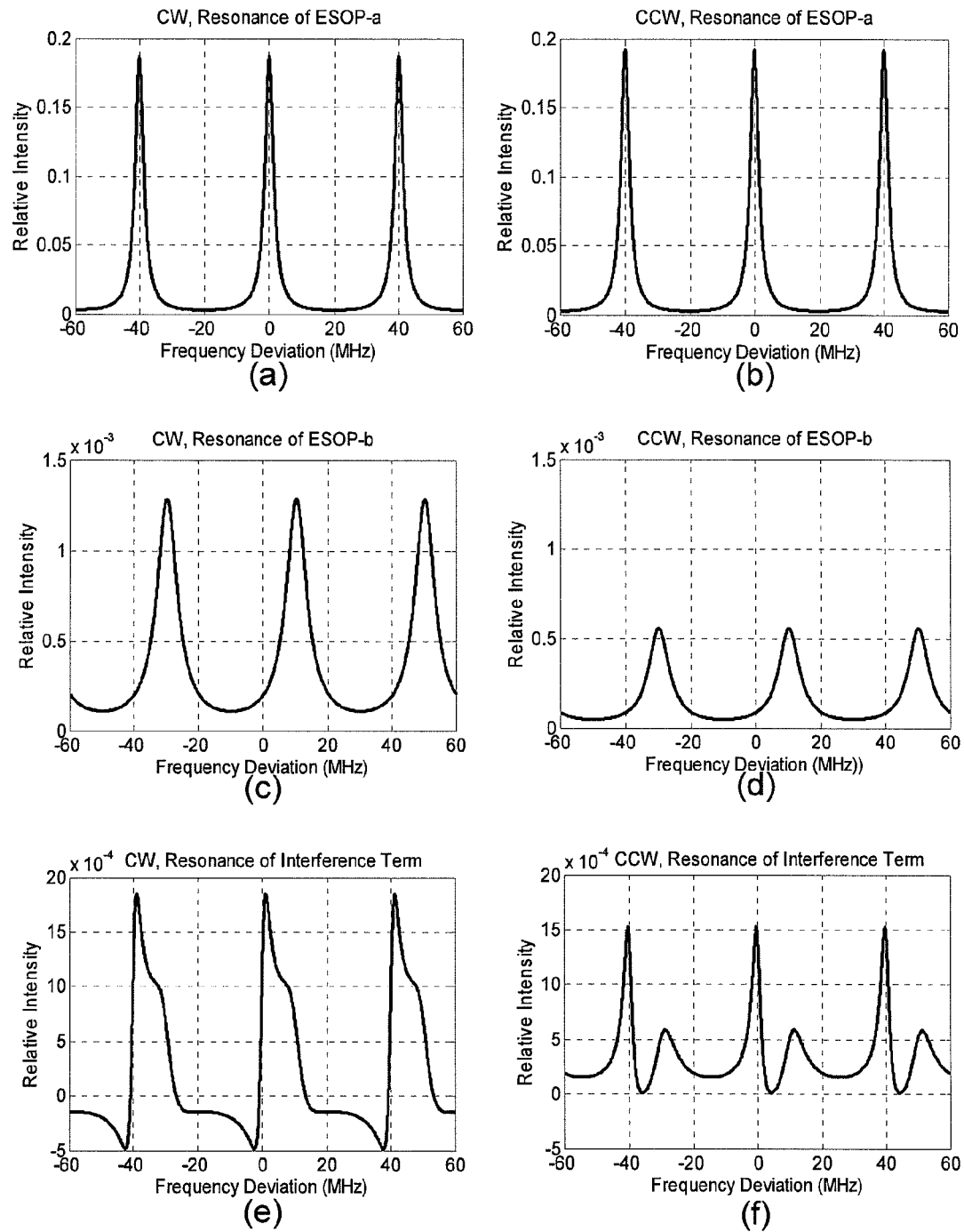
FIGS. 5a-f are plots of RFOG resonance characteristics associated with an embodiment of the invention.

The resonance characteristics of a RFOG can be observed when the frequency of the input monochromatic light source is scanned. For the resonator 300 shown in FIG. 3 with ESOPs shown in FIG. 4, the resonance characteristics are calculated using Eq. (9) and displayed in FIGS. 5a-f for both the CW and CCW directions. FIGS. 5a, c and e are for CW resonance while FIGS. 5b, d, and f are for CCW resonance. FIGS. 5a and b are the CW and CCW resonances of the ESOP-a mode (the first term of Eq. (9)). Their resonance line shapes are very similar. FIGS. 5c and d are the CW and CCW resonances corresponding to the ESOP-b mode (the second term of Eq. (9)). Since ESOP-b mode has a different eigenvalue (phase shift) with respect to ESOP-a, the resonance peaks occurs at a different light source frequency (a shift of 10 MHz is assumed here). The intensity of ESOP-b is much weaker than that of ESOP-a due to unfavorable input coupling conditions. The polarization state of the input light is assumed to align close to horizontal direction, results in most power being coupled to the ESOP-a mode instead of ESOP-b mode. In addition, the CW and CCW peak intensities of ESOP-b are different by more than a factor of 2 because different input polarization beam states are assumed for the CW and CCW direction. FIGS. 5e and f are the CW and CCW resonances corresponding to the last interference term in Eq. (9). Their intensity and resonance line-shapes are obviously different. The total CW and CCW resonances are the summations of all three resonance terms. The frequency difference of the resultant resonance peak of CW and CCW (even when the rotation rate is zero) will cause a non-zero bias error from the RFOG.

Figure 6:
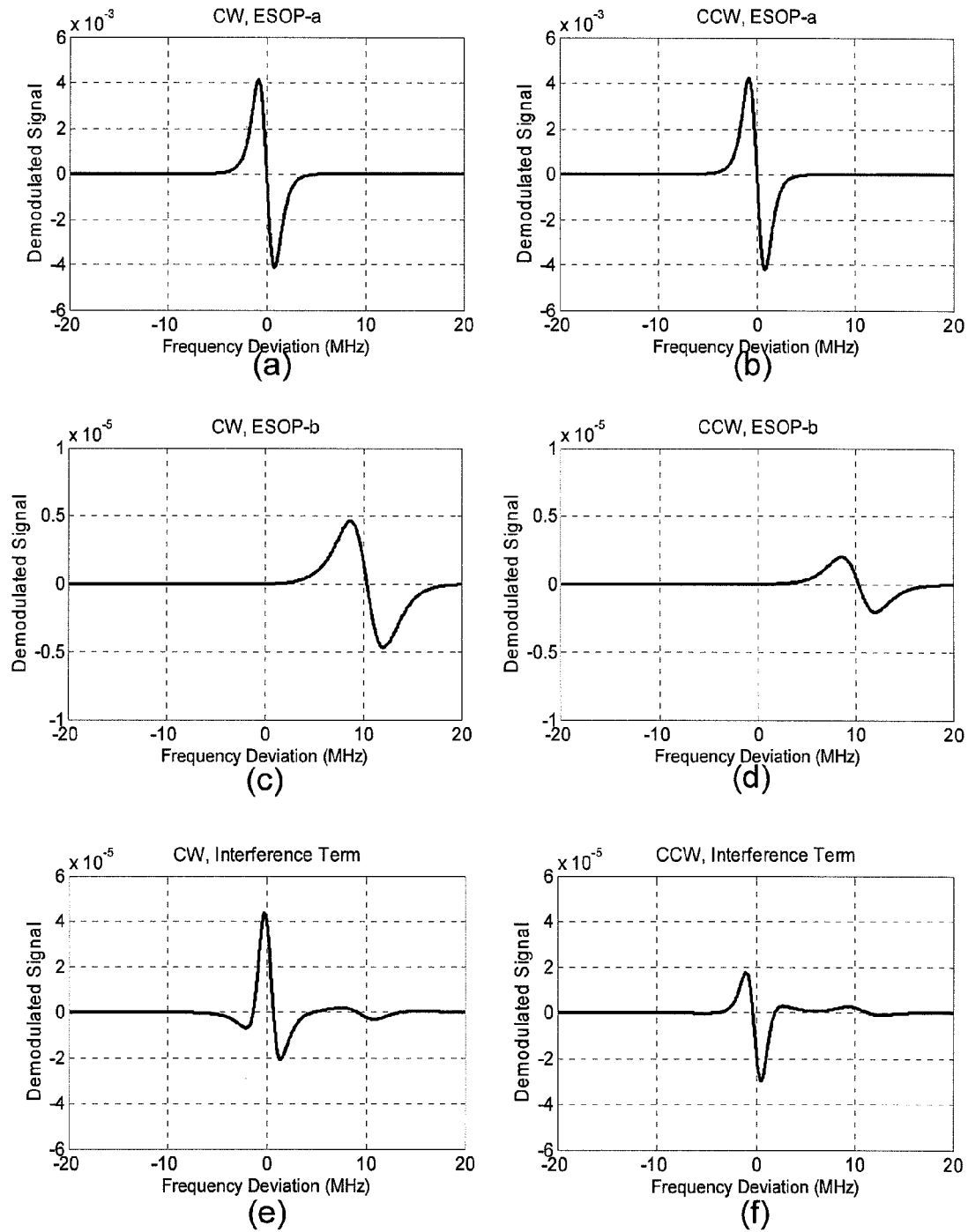
FIGS. 6a-f are plots of RFOG demodulated signal as a function of light source frequency.

For rotation rate sensing, the resonance peak frequencies of CW and CCW ESOP-a mode need to be determined. As described in previous sections, this is typically done by demodulating the photodetector signal at the modulation frequencies of the light source. Using Eq. (12), the relative intensity of demodulated signal as a function of light source frequency (the so called discriminants) are calculated using the same resonator configuration of FIGS. 4 and 5. The demodulated signals are plotted in FIGS. 6a-f for both CW and CCW beams and for the three terms in Eq. (12). FIGS. 6a and b are the CW and CCW discriminants of the ESOP-a mode (the first term of Eq. (12)). As the laser frequency is at the resonance peak of ESOP-a (i.e., the frequency deviation is zero in the FIGURE), the discriminant goes to zero. Servo electronics can use this property to lock the light source frequencies to the resonance peaks. The slope of the discriminant at the resonance frequency determines the gyro's sensitivity. FIGS. 6c and d are the CW and CCW discriminants correspond to the ESOP-b mode (the second term of Eq. (12)). Although shifted away from the resonance frequency of ESOP-a mode as shown, the discriminant of ESOP-b mode still can contribute non-zero intensity at the resonance frequency of ESOP-a mode through its long tail. When the resonance frequency of ESOP-b is close to that of ESOP-a, larger bias error is generated. FIGS. 6e and f are the CW and CCW discriminants corresponding to the last interference term in Eq. (12). The discriminates have significant amount of power at the resonance frequency of ESOP-a mode, generating error that affect the accuracy of resonance tracking servo electronics to detect the resonance frequency of ESOP-a modes.

Impact of Misalignment Angle

For an RFOG with ideally aligned optical elements, i.e., the polarization axes of the PM fiber and polarizing elements are aligned within the plane of incidence of all the mirrors, the angles misalignment is zero $\alpha_{mn}=0$. In this case, the ESOP-a and ESOP-b become linear polarization states along the horizontal and vertical directions. Since all the angles are zero, the bias contribution from the interference term will be zero.

Figure 7:
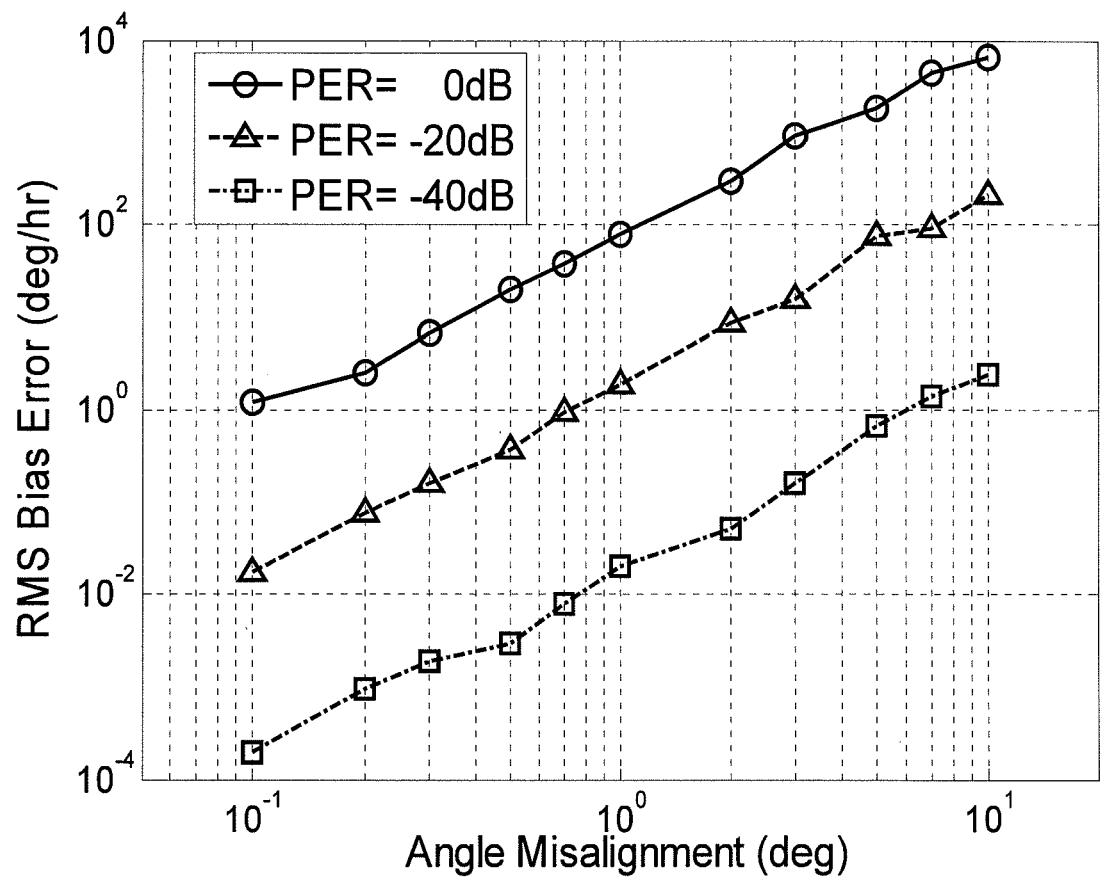
FIG. 7 is a plot of RFOG root-mean-square bias error as a function of misalignment angle at several PER value of polarizing element.

As the angle misalignment increases, it is expected that the bias error will increase due to increases of the interference term. FIG. 7 displays a calculated relation of bias error versus angle misalignment. In FIG. 7, three curves correspond to three different polarization extinction ratios (PER) of polarizers 304 and 306 in FIG. 3. Each data point is a root-mean-square of 20 bias values. Each of the 20 bias values is calculated from a random distribution of all $\alpha_{mn}$ angles that has maximum angle misalignment shown by the data point's x-coordinate (misalignment angle). Minimizing angle misalignment is an effective way to reduce bias errors of the RFOG.

Impact of Polarizing Element PER

The impact of PER of the polarizers 304 and 306 on bias error has also been shown in FIG. 7 by the relative positions of the three curves. As the PER amplitude increases (more negative PER values), the power of the unwanted ESOP-b mode decreases, leading to smaller bias errors. It is therefore advantageous to have larger (more negative) PER of polarizing element for better RFOG performance.

Impact of Mirror Polarization Dependent Reflectivity

The polarization cross-coupling in the resonator 300 of FIG. 3 is a direct result of unisotropic reflectivity of the mirrors. A dielectric coated mirror typically has different reflectivity for light polarized parallel (x-component) and orthogonal (y-component) to the plane of incidence. This causes cross-coupling and interference of ESOP-a and ESOP-b modes when they are coupled out of the resonator. Reducing the polarization dependent reflectivity of the mirrors is indeed found effective to reduce the bias errors of the RFOG.

Figure 8:
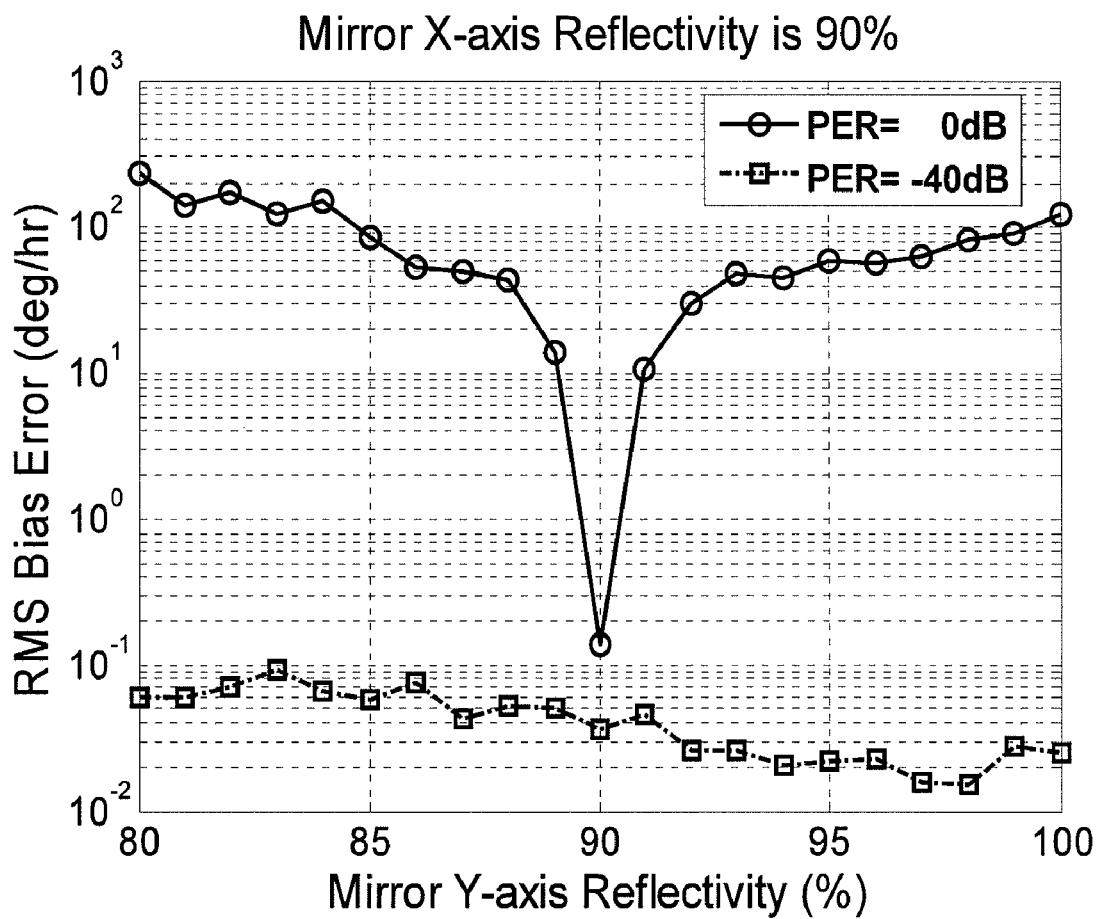
FIG. 8 is a plot of RFOG root-mean-square bias error as a function of mirror reflectivity of the Y-axis.

FIG. 8 shows RFOG bias error as a function of mirror Y-axis reflectivity of three identical mirrors when the X-axis reflectivity is 90%. Two curves are presented, one for elements 304 and 306 with PER=0, and the other with PER=–40 dB. Each data point again is a root-mean-square of 20 bias values. Each of the 20 bias values is calculated from a random distribution of all $\alpha_{mn}$ angles that has maximum angle misalignment of 1°. The bias decreases significantly when the reflectivity of the Y-axis approaches that of the X-axis, i.e., bias reaches a minimum value when Ry=Rx. For PER=–40 dB, there is no obvious minimus at when Ry=Rx. In other words, the resonator tends to have small polarization mode induced bias error when it has zero polarization dependent loss in the cavity. The present invention uses mirrors with small polarization dependent reflectivity in the resonator to apply this effect.

Resonator Symmetry

As mentioned previously in this invention, $H_{CW\_A}$ and $H_{CW\_B}$ are generally not identical if the resonator is not perfectly symmetric, (i.e., $R_3 \neq R_1$, or $P_4 \neq P_6$, or $X_{23} \neq X_{21}$, or $X_{34} \neq X_{16}$, or $X_{45} \neq X_{65}$). Their eigenvalue and eigenvectors are thus different. This will cause CW and CCW resonance frequency to differ from each other even when the rotation rate is zero.

Figure 9:
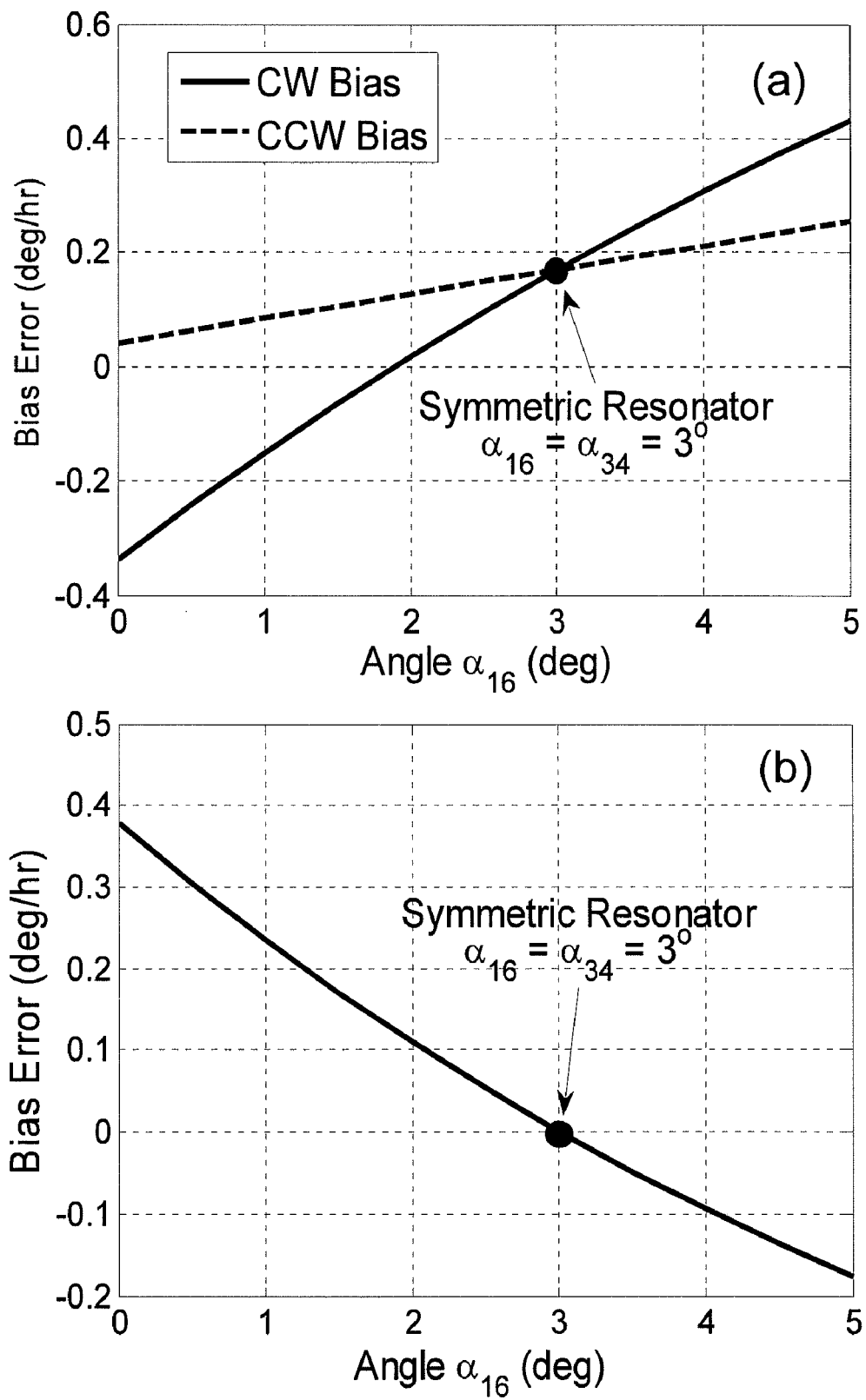
FIGS. 9a and b are plots of RFOG bias error as a function of angle showing that bias error becomes very small when the resonator is in a symmetric configuration.

If the resonator is in a perfect symmetric configuration, the matrices $H_{CW\_A}$ and $H_{CW\_B}$ become identical. Their eigenvalue and eigenvectors are thus identical, resulting in zero effective bias errors because the bias of CW and CCW cancels each other. FIGS. 9a-b show calculation results of bias versus resonator symmetry. In the calculation, it is assumed that the resonator 300 in FIG. 3 has symmetric configurations everywhere except the angle of $a_{16}$ between polarization axis of the polarizer 306 and the plane of incidence of the mirror 301 is varied from 0° to 5°. The resonator 300 becomes symmetric only when $a_{16}=3°$ because $a_{34}=3°$. As shown in FIG. 9a, the CW and CCW have different bias offset everywhere except when $a_{16}=a_{34}=3°$. Since the measured RFOG bias error (shown in FIG. 9b) is the difference of CW and CCW bias, there will be zero bias error when the resonator 300 is in a perfect symmetric configuration.

Inverted W-Shape Resonator

Figure 10:
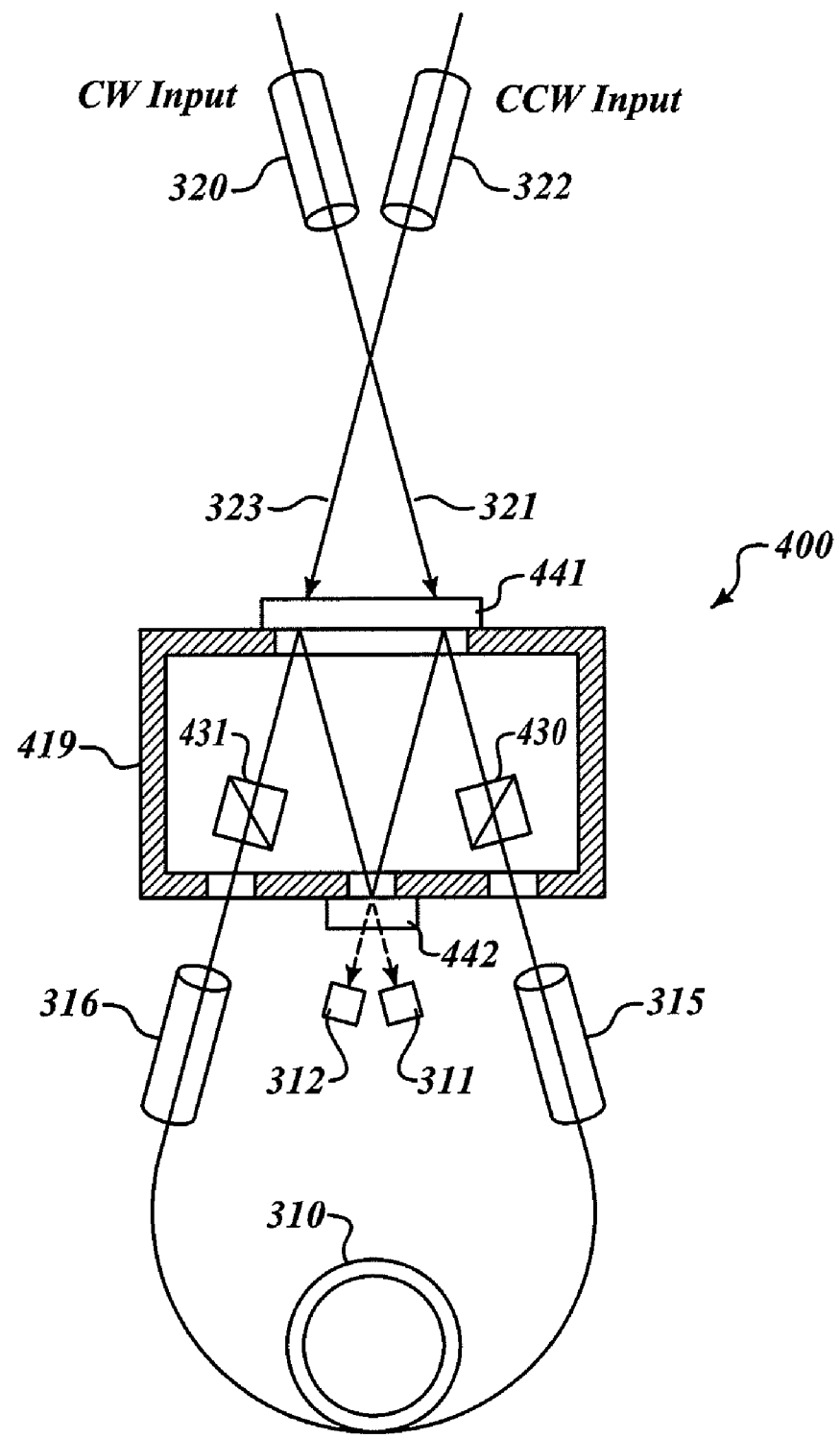
FIG. 10 is a schematic view of a RFOG resonator according to one embodiment of the invention.

Another embodiment of the current invention is a resonator 400 shown in FIG. 10. The resonator 400 is an inverted W-shape hollow core fiber resonator that includes a hollow core fiber coil 310, a common input coupling mirror 441 for the CW beam 321 and the CCW beam 323, an output coupling mirror 442, polarizers 430 and 431, and the collimating optics 315 and 316. The resonator mirrors 441 and 442 are supported by a solid frame 419 to provide mechanical stability of the resonator 400. The output coupled CW and CCW light are directed to the photodetectors 311 and 312 respectively for resonance signal detection.

This embodiment is similar to that shown in FIG. 3 but uses two resonator mirrors 441 and 442 instead of three mirrors. The mirror 441 is the input coupling mirror for both CW (beam 321) and CCW (beams 323) inputs. This two-mirror design makes it easier for the resonator to obtain a symmetric configuration because the CW and CCW input coupling mirror are now the same mirror. The two mirrors 441 and 442 can also be aligned into a parallel position as shown in FIG. 10 to achieve a symmetric resonator. It is much easier to align two mirrors into parallel position than to align three mirrors into symmetric positions having the same plane of incidence.

Figure 11:
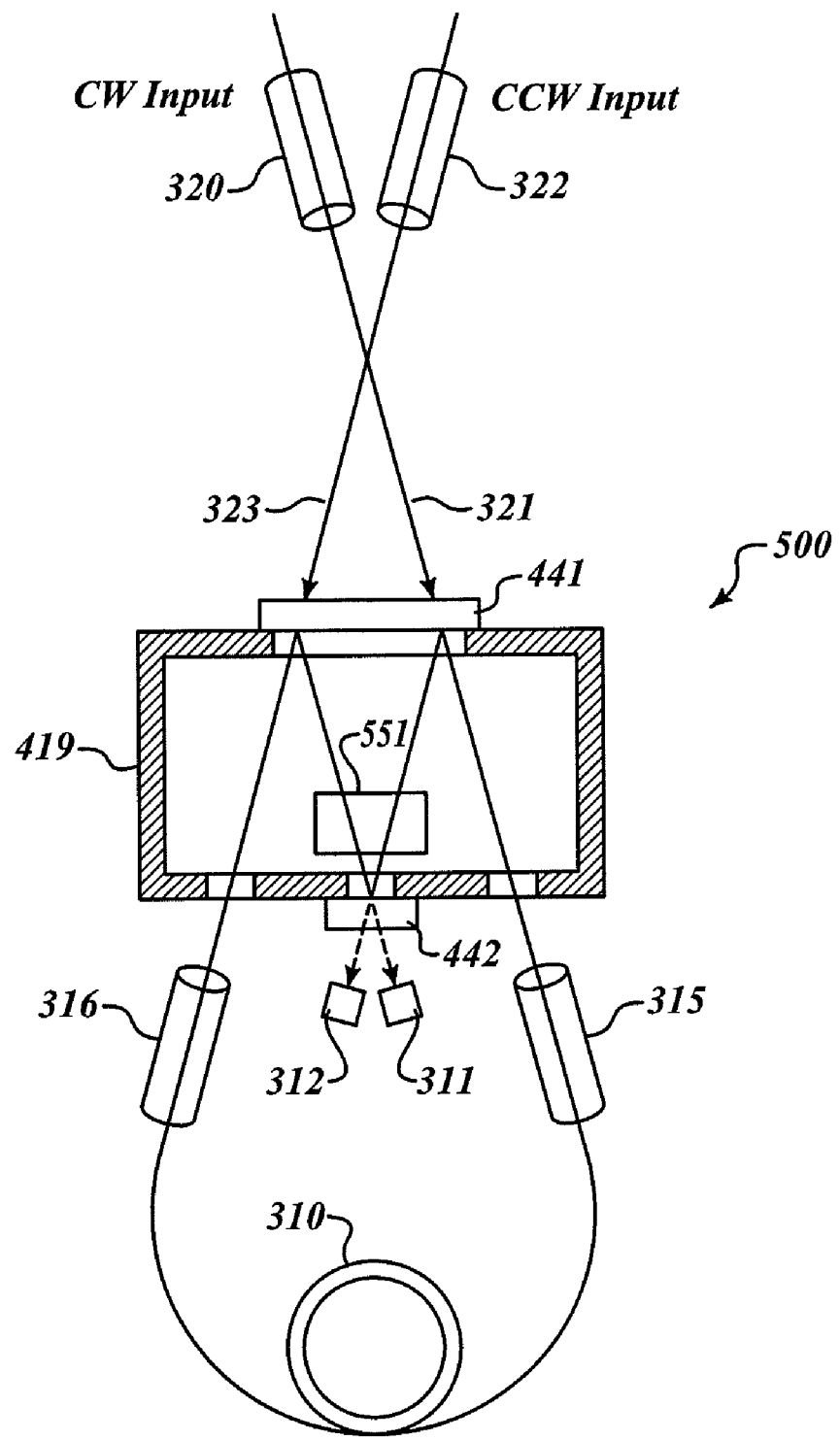
FIG. 11 is a schematic view of a RFOG resonator using a single polarizing element according to another embodiment of the invention.

FIG. 11 shows another embodiment of an RFOG using the inverted W-shape resonator 500. The only difference of this embodiment from the previous one is the use of a single polarizer 551 within the resonator 500 instead of two. Double passing through the polarizer 551 makes the effective PER of the polarizer 551 the same as that of the combined PER of two polarizers (FIG. 10). More importantly, it is easier to align this two-mirror one-polarizer resonator 500 into a symmetric configuration for reducing bias errors.

Figure 12:
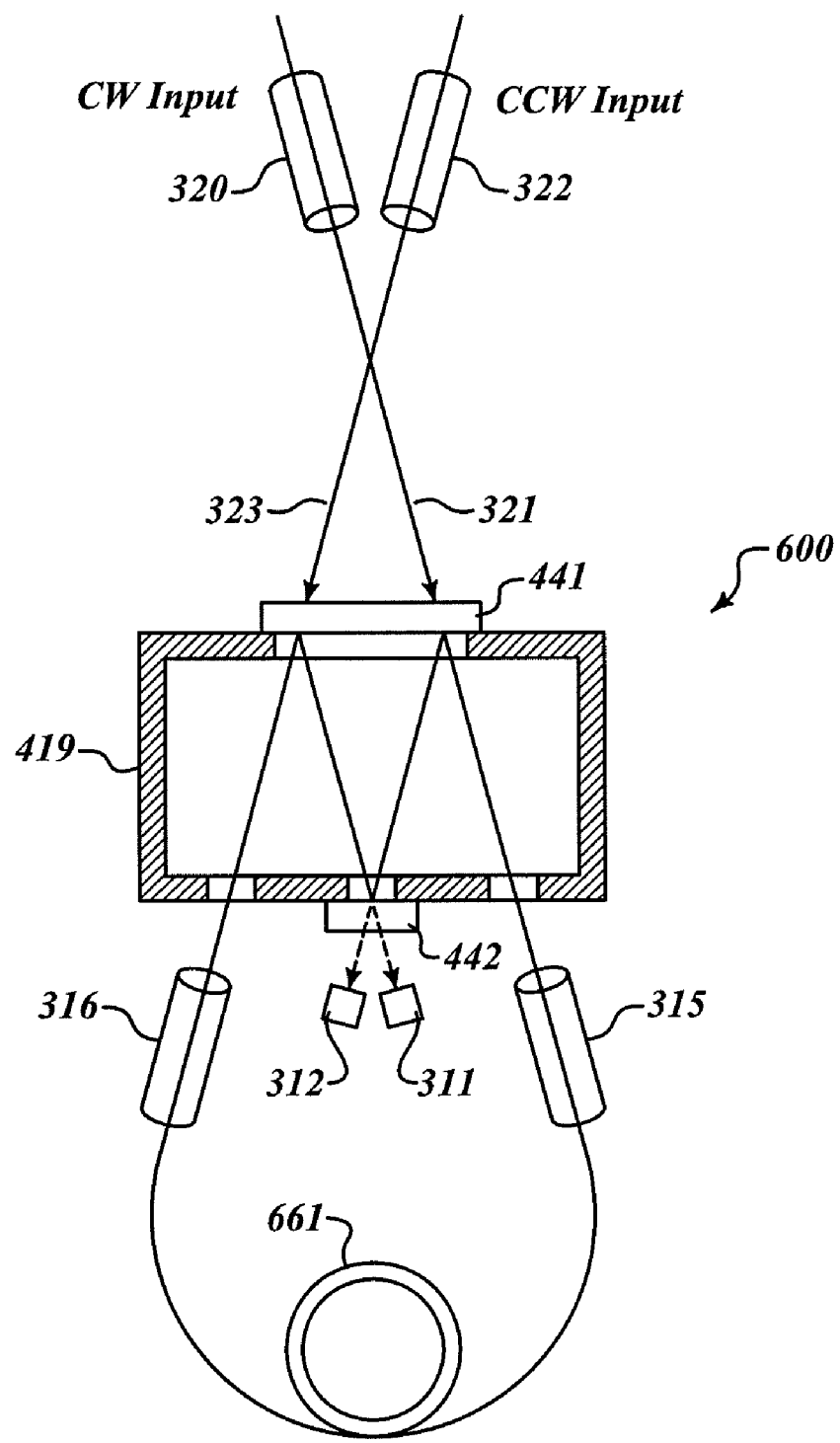
FIG. 12 is a schematic view of a RFOG resonator using a polarizing fiber according to an embodiment of the invention.

Another embodiment of the current invention is shown in FIG. 12. The resonator 600 is identical to previous two embodiments except that the resonator 600 uses a polarizing fiber 661. The polarizing fiber 661 functions to transmit light of one polarization, while strongly suppressing the orthogonal polarization. The requirement of polarizing elements in previous embodiments can be significantly reduced or the polarizing elements can be completely removed (as shown in FIG. 12) when the fiber has enough PER. Polarizing fiber naturally has the polarization axis of the fiber aligned with the polarizing axis (pass-axis).

While the preferred embodiment of the invention has been illustrated and described, as noted above, many changes can be made without departing from the spirit and scope of the invention. For example, a combined PER (if two polarizing elements are used) is better than 80 dB, but all depends on the requirements. Also, angles among a primary polarizing axis or planes of incidence of all the optical elements are as small as possible (<2 deg.). Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An optical gyro comprising:
    a ring resonator configured to circulate light beams in counter-propagating directions, the ring resonator comprising an optical fiber coil having first and second ends;
    first and second optical elements configured to
        receive two input light beams; and
        transmit a majority of the two input light beams in counter-propagating directions in the ring resonator, the majority of each input light beams entering one of the first and second ends of the optical fiber coil; and
    a third optical element configured to
        direct a majority of the circulating light beams in the counter-propagating directions of the ring resonator via the first and second optical elements; and
        derive a transmission component of the circulating light beams, the transmission component impinging on a photodetector for each of the counter-propagating beams.

2. The optical gyro according to claim 1, wherein the first, second and third optical elements comprise optical mirrors having substantially same reflectivities for light with different polarization states and wherein the optical fiber coil comprises a hollow core fiber.

3. The optical gyro according to claim 1, wherein incidence angles of light beams on the first, second and third optical elements are substantially small for obtaining same reflectivity for light with different polarization states.

4. The optical gyro according to claim 1, further comprising at least one polarizing element with substantially high polarization extinction ratio (PER) located between the first end of the optical fiber coil, and between the second optical element and the second end of the optical fiber coil.

5. The optical gyro according to claim 1, wherein angles among at least one of a primary polarizing axis or planes of incidence of all the optical elements are substantially small.

6. The optical gyro according to claim 1, further comprising a housing configured to support the first, second, and third optical elements, the housing having a configuration substantially symmetric dimensions based on Jones matrix.

7. An optical gyro comprising:
    a ring resonator configured to circulate light beams in counter-propagating directions, the ring resonator comprising an optical fiber coil having first and second ends;
    a first optical element configured to
        receive two input light beams; and
        transmit a majority of the two input light beams in counter-propagating directions in the ring resonator, the majority of the input light beams entering one of the first and second ends of the optical fiber coil; and
    a second optical element configured to direct a majority of the circulating light beams in the counter-propagating directions of the ring resonator via the first and second optical elements; and derive a transmission component of the circulating light beams, the transmission component impinging on a photodetector for each of the counter-propagating beams.

8. The optical gyro according to claim 7, wherein the first and second optical elements comprise optical mirrors having substantially same reflectivities for light with different polarization states.

9. The optical gyro according to claim 7, wherein incidence angles of light beams on the first and second optical elements are substantially small to obtain same reflectivity for light with different polarization states.

10. The optical gyro according to claim 7, further comprising at least one polarizing element with substantially high PER located between the first optical element and the first end of the optical fiber coil, and between the second optical element and the second end of the optical fiber coil.

11. The optical gyro according to claim 7, wherein angles among at least one of a primary polarizing axis or planes of incidence of all the optical elements are substantially small.

12. The optical gyro according to claim 7, further comprising a housing configured to support the first, second, and third optical elements, the housing having a configuration substantially symmetric based on Jones matrix.

13. The optical gyro according to claim 7 further comprising at least one dual-pass polarizing element with substantially high PER located between the first optical element and the second optical element.

14. The optical gyro according to claim 7, wherein the optical fiber coil comprises a hollow core, polarizing fiber.

15. A method comprising:
receiving two input light beams at least one first optical element;

transmitting a majority of the two input light beams in counter-propagating directions in a ring resonator having optical fiber coil having first and second ends, the majority of the input light beams entering one of the first and second ends of the optical fiber coil;

receiving the counter-propagating light beams from the first and second ends of the optical fiber coil;

directing the received counter-propagating light beams to a second optical element;

at the second optical element
directing a majority of the directed counter-propagating light beams to the optical fiber coil via the at least one first optical element; and directing a portion of the directed counter-propagating light beams to at least one photodetector.

16. The method of claim 15, wherein the first and second optical elements comprise optical mirrors having substantially same reflectivities for light with different polarization states.

17. The method of claim 15, further comprising at least one polarizing element with substantially high PER located between the first optical element and the first end of the optical fiber coil, and between the second optical element and the second end of the optical fiber coil.

18. The method of claim 15, further comprising supporting the at least one first optical element and the second optical element using a housing, wherein the housing having a configuration substantially symmetric based on Jones matrix.

19. The method of claim 15, further comprising at least one dual-pass polarizing element with substantially high PER located between the first optical element and the second optical element thereby reducing power of any unwanted polarization mode.

20. The method of claim 15, wherein the optical fiber coil comprises a hollow core, polarizing fiber.

* * * * *